United States Patent [19]
Sanderson et al.

[11] 4,381,366
[45] Apr. 26, 1983

[54] FIBRE REINFORCED POLYAMIDE MOULDING COMPOUNDS

[75] Inventors: John R. Sanderson; Rudolf Binsack; Dietrich Michael; Heinrich Bonten, all of Krefeld, Fed. Rep. of Germany

[73] Assignee: Bayer Aktiengesellschaft, Leverkusen, Fed. Rep. of Germany

[21] Appl. No.: 266,957

[22] Filed: May 26, 1981

Related U.S. Application Data

[63] Continuation of Ser. No. 163,693, Jun. 27, 1980, abandoned.

[30] Foreign Application Priority Data

Jul. 3, 1979 [DE] Fed. Rep. of Germany ....... 2926778

[51] Int. Cl.³ ....................... C08L 77/00; C08L 51/00
[52] U.S. Cl. ...................................... 524/504; 525/66
[58] Field of Search ............ 525/66; 260/37 H, 42.17, 260/42.18; 524/504

[56] References Cited

U.S. PATENT DOCUMENTS 4,080,349  3/1978  Wurmb ................................. 525/66

FOREIGN PATENT DOCUMENTS 2454770  5/1976  Fed. Rep. of Germany ........ 525/66
2703416  8/1978  Fed. Rep. of Germany .
2758568  7/1979  Fed. Rep. of Germany ........ 525/66
45-30944 10/1970  Japan .................................... 525/66
45-30945 10/1970  Japan .................................... 525/66
1519355  7/1978  United Kingdom .

Primary Examiner—Paul Lieberman
Attorney, Agent, or Firm—Connolly and Hutz

[57] ABSTRACT

Reinforced polyamide moulding blends with improved impact strength containing as modifying agent a graft product consisting of a polyolefine as graft-substrate and grafted units of unsaturated carboxylic acids and/or derivatives therefrom and which graft product is prepared by a special oxidation process.

4 Claims, No Drawings

FIBRE REINFORCED POLYAMIDE MOULDING COMPOUNDS

This application is a continuation of application Ser. No. 163,693 filed June 27, 1980, and now abandoned.

This invention relates to fibre reinforced polyamide moulding blends having improved impact strength.

Polyamides, in particular polyamide 6 and polyamide 66, have achieved a position of considerable commercial importance as construction materials because of their great toughness combined with excellent chemical resistance, but the strength and rigidity of reinforced polyamides are insufficient for many purposes. These disadvantages are to a large extent overcome by providing the polyamides with reinforcing materials. Polyamides reinforced with glass fibres, for example, have great tensile strength and flexural strength, rigidity and hardness as well as improved dimensional stability both at normal temperature and under heat, but these improvements in properties are obtained at the expense of a severe loss in toughness and flexibility. One particular disadvantage of glass fibre reinforced polyamides compared with unreinforced polyamides is their reduced impact strength. Furthermore, glass fibre reinforced polyamides which have been coloured with certain pigments are generally less tough than the uncoloured products.

The bonding agents used in practice, such as trimethoxyaminopropysilane (Formula II)

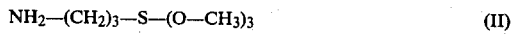

$$NH_2-(CH_2)_3-S-(O-CH_3)_3 \quad (II)$$

for example, and sizes which improve the bond between the glass fibres and the polymer matrix and facilitate incorporation of the glass fibres in the matrix only slightly improve the impact strength of glass fibre reinforced polyamides.

It is also known that the addition of low molecular weight plasticizers may increase the toughness of unreinforced polyamides. Reinforced polyamides containing such plasticizers have a reduced rigidity. Plasticizers are liable to interfere with the formation of a bond between the surface of the filler and the polymer matrix, thereby reducing the toughness and tensile strength of the product to very low values.

The impact strength of polyamide moulding compounds can be improved by the addition of graft copolymers of (meth)-acrylic acid or their esters on olefine/vinyl esters or olefine/acrylic ester copolymers as described in German Offenlegungsschrift No. 2,454,770. The improvement achieved in reinforced polyamides is only slight. According to German Offenlegungsschrift No. 2,703,416, the impact strength of reinforced polyamides can be improved by the addition of graft copolymers of (meth)acrylic acid on polyethylene or polypropylene or copolymers of ethylene and propylene, but again the improvement is slight.

The polyolefine graft polymers hitherto used for modifying reinforced polyamides are conventionally prepared products containing one grafting position for about every 20,000 to 30,000 carbon atoms in the polymer chain, in which the average molecular weight $M_w$ of the grafting branches, determined as weight average, is generally in the region of 100,000 to 1,000,000.

It has now surprisingly been found that an improvement in toughness can be obtained without significant disadvantages by adding to fibres, in particular to glass fibre reinforced polyamides, a new type of graft polymer having one grafting position to about every 400 to 2000 carbon atoms, with an average molecular weight $M_w$ of the grafting branches amounting to 2000 to 40,000.

The present invention therefore relates to polyamide blends comprising (1) polyamide,
(2) 10 to 60% by weight of fibres, in particular glass fibres, or glass pellets,
(3) 0 to 20% by weight of fillers or other conventional additives and
(4) 1 to 30% by weight, preferably 2 to 20% by weight of graft products consisting of
  (a) 70 to 99% by weight, preferably 80 to 98% by weight of a homopolymer of aliphatic and/or aromatic monoolefines or a copolymer of the aforesaid olefines and up to 50% by weight of other monoolefinically unsaturated compounds capable of radical polymerisation and/or up to 5% by weight of diolefines as graft substrate and
  (b) 1 to 30% by weight, preferably 2 to 20% by weight of grafted units of
  (α) 0 to 100% by weight, preferably 0 to 50% by weight of an unsaturated acid corresponding to the general formula

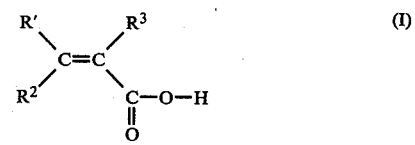

in which $R_1$, $R_2$ and $R_3$ may be the same or different and represent hydrogen, $C_1$ to $C_5$ alkyl, $C_6$ to $C_{12}$ aryl or $C_7$ to $C_{13}$ alkylaryl,
  (β) 0 to 100% by weight, preferably 0 to 70% by weight of esters of the unsaturated acid corresponding to formula (I) having 1 to 8, preferably 2 to 4 carbon-atoms in the alcohol, and/or
  (γ) 0 to 30% by weight, preferably 0 to 10% by weight of acrylamide and/or
  (δ) 0 to 80% by weight, preferably 0 to 60% by weight of acrylonitrile, wherein the sum of (1) to (4), respectively of (a) and (b) and of α to δ must in each case be 100% by weight, characterised in that the graft products have a peroxide content (in the form of OOH groups) of 0 to 5000 ppm, preferably 0 to 500 ppm and have been prepared by a process of graft polymerisation in which the solvent-free liquid of the polymer used as graft substrate and the monomers which are to be grafted on it are mixed vigorously with oxygen or with gases containing oxygen at a pressure of 1 to 150 bar and a temperature of 80° to 300° C., and the residual monomers are removed after polymerisation.

In this very rational new process, the graft substrate is not, as hitherto, used as a solution or a latex, and prolonged swelling of the graft substrate by graft monomers as described in German Offenlegungsschrift No. 2,454,770 is also unnecessary. In a first stage of the process, the polyolefine graft substrate is reacted in the molten state with oxygen under conditions of vigourous mixing, preferably in an extruder, so that peroxide groups are formed. In a second stage of the process, preferably during the same passage through the extruder, the vinyl compounds which are capable of radical polymerisation are grafted on the polyolefine graft substrate, the peroxide groups formed in the first stage providing the initiator radicals.

The polymers used as polyolefine graft substrate (a) may be any aliphatic or aromatic polyolefines such as, for example, polyethylene, polypropylene, polybutene, polystyrene or their copolymers, e.g. copolymers of ethylene and propylene or of styrene and acrylonitrile. The polyolefines may also contain up to 5% by weight of diolefine residues and up to 50% by weight of residues of vinyl compounds which are capable of radical copolymerisation, in particular those based on vinyl esters, preferably vinyl acetate or unsaturated carboxylic acids and/or their derivatives.

Preferred unsaturated carboxylic acids or acid derivatives include acrylic acid and methacrylic acid and their esters and amides, in particular the methyl, ethyl, n-propyl and isopropyl, n-, iso-, sec.- and tert.-butyl, 2-ethylhexyl and cyclohexyl esters of these acids.

Examples of preferred graft monomers (b) include acrylic acid, methacrylic acid, the methyl, ethyl, n-propyl and isopropyl, n-, iso-, sec.- and tert.-butyl, 2-ethylhexyl and cyclohexyl esters of these acids, (meth)acrylamide, vinyl acetate, maleic acid anhydride and acrylonitrile. The graft monomers may also contain 0 to 30% by weight of aromatic monoolefines such as styrene.

Particularly preferred graft monomers (b) include acrylic acid, n-butylacrylate, iso-butylacrylate, tert.-butylacrylate and acrylonitrile.

The quantity of active oxygen (peroxide groups) introduced in the first stage of the grafting process may be about 1000 to 10,000 ppm. No significant reduction in the molecular weight of the graft basis occurs during the formation of peroxide groups. The activated positions are uniformly distributed over the macromolecules of the graft substrate so that, in contrast to the graft polymerization processes known in the art, a very large number of active positions are available. This results in the formation of a large number of relatively short side chains during the subsequent graft polymerisation.

The method of analysis of graft product is illustrated below with the aid of the example of a polyethylene grafted with butylacrylate and acrylic acid.

The polyethylene graft polymer is dissolved at an elevated temperature in a mixture of the solvents, dimethylformamide and methyl cyclohexane, which separate from each other at room temperature, and the graft polymeris fractionated from the homogeneous solution at 25° C. (see R. Kuhn, Makromolekulare Chemie 177, 1525 (1976)). Any butyl acrylate/acrylic acid copolymer which has not been grafted on the graft basis is found in the lower phase which is rich in dimethylformamide while ungrafted polyethylene and polyethylene grafted with butyl acrylate and acrylic acid is found in the upper phase.

The graft yield $(C_G-C)/C_G$ can be determined from the quantity of butyl acrylate/acrylic acid copolymer C which has not been grafted and all the grafted and ungrafted butyl acrylate/acrylic acid copolymer components $C_G$. The graft yields are generally in the region of 50 to 90%.

Gel chromatograms (solvent: tetrahydrofuran) are obtained from the ungrafted butyl acrylate/acrylic acid copolymer. The intrinsic viscosities are determined in tetrahydrofuran and the molecular weights $M_w$ are calculated from the results on the basis of a universal calibration (see Hoffmann, H. Krömer, R. Kuhn, Polymeranalytik I, Georg Thieme Verlag, Stuttgart 1977). The molecular weights of copolymer C correspond to the molecular weights of the graft branches.

Preferred graft products for the purpose of the invention are built up on polyethylene as graft substrate and a graft of 1 to 15% by weight of n-butylacrylate, 0.1 to 3% by weight of acrylic acid and 0 to 400 ppm of peroxide (as OOH). Particularly preferred graft products consist of polyethylene as graft substrate and a graft of 1 to 15% by weight of tert.-butyl acrylate and 0 to 400 ppm of peroxide (as OOH).

The polyamides used may be obtained by the polymerisation of lactams containing at least 7 ring members, preferably ε-caprolactam, or by the polycondensation of aminocarboxylic acids such as α-aminocaproic acid or α-amino undecanoic acid. Polyamides obtained by the polycondensation of diamines and dicarboxylic acids are also suitable, e.g. polyamides of hexamethylene diamine and adipic or sebacic acid. Copolyamides of ε-caprolactam or α-aminocaproic acid, adipic acid and hexamethylenediamine and mixtures of polyamide 6 and polyamide 6,6 are also suitable. Polyamide 6 and/or polyamide 6,6 are particularly preferred.

The relative viscosity of the polyamides used, determined on a 1% solution in m-cresol at 25° C., should be in the range of 2.5 to 5.0, preferably 2.8 to 4.1.

The polyamide moulding compounds according to the invention are reinforced with 10 to 60% by weight of fibres, preferably glass fibres, which may have been treated with the usual commercial bonding agents and sizes. The fibres preferably have a diameter of 8 to 14 μm and in the granulate they preferably have an average fibre length of 0.1 to 0.5 mm.

Instead of containing glass fibres, the moulding compounds according to the invention may contain glass pellets or the glass fibres may be used in combination with other fillers or reinforcing materials such as glass pellets, asbestos, talcum, kaolin, wollastonite, microvite, mica or chalk. These may be used in quantities of up to 50% by weight, based on the quantity of glass fibres. In addition, the moulding blends according to the invention may contain the usual additives such as dyes, pigments, stabilizers, nucleating agents, mould release agents and flame retarding agents.

The graft products according to the invention are preferably incorporated together with the glass fibres and/or other fillers and reinforcing materials by known methods, using, for example, the usual one-shaft and/or multishaft screws.

The moulding blends according to the invention are distinguished by a marked improvement in toughness without substantial loss of the other characteristic properties of polyamides. They are eminently suitable for the manufacture of moulded articles which are required to withstand high impact stresses, for example for the construction of housings for drilling machines or bumpers.

EXAMPLES

Preparation of graft products I–III

Graft products, I, II and III shown in Table 1, which are based on Baylon ® 19 N 430 (high pressure polyethylene of BAYER AG) were prepared in a double screw extruder with self-cleaning screws in which the screw shafts measuring 57 mm in diameter and 41 D in length both rotated in the same sense. Compression of the melt was achieved by providing double thread variable screws with left-handed thread, abrupt changes in pitch and kneading blocks shifted to the left. Air was forced into the induction zone at the rate of 400 l per hour under a pressure of 100 to 130 bar and into the oxidation zone at the rate of 1200 l per hour under a pressure of 70 to 90 bar.

The graft monomers were fed into the polymerisation zone at a pressure of 15 to 18 bar. Unreacted monomers were subsequently evaporated and the graft product was extruded as a strand and granulated.

TABLE 1

| Composition | Graft product | | |
|---|---|---|---|
| | I | II | III |
| Acrylic acid | 1.35 | 0.57 | — |
| n-butyl acrylate | 1.1 | 3.4 | — |
| tert.-butyl acrylate | — | — | 5.3 |
| Peroxide (as OOH) ppm | 360 | 290 | 380 |
| Melt flow index according to DIN 53 735 determined at 190° C. under a load of 2.16 kp; Measuring nozzle: 2.095 mm ⌀ Length: 8 mm. | 2.4 | 2.6 | 2.8 |

EXAMPLES 1-5

Mixtures of polycaprolactam having a viscosity of 3.1 measured on a 1% solution in m-cresol at 25° C. and the usual quantity of nucleating agents and mould release agents having the composition indicated in Table 2 were melted in a single screw extruder at 250° to 280° C. Glass fibres in the form of chopped strands were incorporated in the molten polycarpolactam in such a quantity that in mixture extruded in the form of a strand contained about 30% by weight of glass fibres. The strands were cooled in a water bath, granulated and dried. The polyamide granulate was used to produce test samples in an injection moulding machine. The samples were tested dry and in the freshly moulded state.

The multiaxial impact test according to DIN 53 443 was carried out to assess the mechanical properties.

It is found in practice that the impact strength of fibre reinforced materials depends to a large extent on the degree of orientation of the fibres. In test samples for the impact bending test DIN 53 453 produced by the injection moulding process, the glass fibres are highly orientated in the direction of flow, i.e. parallel to the length of the sample. The impact is directed transverse to the direction of flow (transversely to the direction of the fibres). This is the reason why the values for impact strength ($a_n$) are found to increase with increasing glass fibre content, but the impact strength is considerably lower in the direction of flow (direction of the fibres).

It is found that the impact or falling pin test of DIN 53 443 illustrated in FIG. 3 gives a correct picture of the toughness of reinforced polyamides under impact stress. The ball 4 in this figure has a radius of 25 mm.

(a) indicates the point of impact of the ball, (b) represents the sprue stalk (ϕ ca 4 mm) at the centre of the base and (c) is a testing point parallel to (a).

It is a precondition that the test sample should have a very low degree of orientation. This condition is fulfilled, for example, in the test box illustrated in FIGS. 1 and 2, which has a height 1 of 40 mm, a width 2 of 46.7 mm and a length 3 of 106.7 mm or 3' of 120 mm and a wall thickness 5 of 1.5 mm.

TABLE 2

| Example No. | 1 | 2 | 3 | 4 | 5 |
|---|---|---|---|---|---|
| Graft polymer | — | I | II | III | III |
| Graft polymer (% by wt.) | — | 5 | 5 | 5 | 5 |
| Reaction temperature (°C.) | 258 | 261 | 260 | 259 | 269 |
| Physical properties | | | | | |
| Impact strength (kJ/m²)[b] | 59 | 56 | 56 | 62 | 60 |
| Notched impact strength (kJ/m²)[b] | 12.5 | 17.9 | 17.7 | 18.6 | 18.6 |
| Damaging work according to DIN 53 443 (Nm) | 1.2 | 1.6 | 1.7 | 2.2 | 2.4 |

[a]DIN 53 452
[b]DIN 53 453

We claim:

1. Polyamide moulding blends comprising
(1) polyamide,
(2) 10 to 60% by weight of fibres, glass pellets, or mixtures thereof
(3) 0 to 20% by weight of other usual additives and
(4) 1 to 30% by weight of graft products consisting of
  (a) 70 to 99% by weight of a homopolymer of aliphatic and/or aromatic monoolefines or mixtures thereof or a copolymer of these olefines, up to 50% by weight of other monoolefinically unsaturated compounds capable of radical polymerisation and/or up to 5% by weight of diolefines or mixtures thereof as graft substrate and
  (b) 1 to 30% by weight of grafted units of
    (α) 0 to 100% by weight of α,β-unsaturated acids corresponding to the general formula

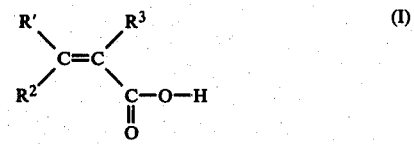

in which $R_1$, $R_2$ and $R_3$ which may be the same or different represent hydrogen, a $C_1$ to $C_5$ alkyl group, a $C_6$ to $C_{12}$ aryl group or a $C_7$ to $C_{13}$ alkylaryl group;
    (β) 0 to 100% by weight of esters of the unsaturated acid of formula (I) having 1 to 8 carbon atoms in the alcohol moiety,
    (γ) 0 to 30% by weight of acrylamide and/or
    (δ) 0 to 30% by weight of acrylonitrile or styrene, or mixtures thereof wherein the sum of 1, to 4, and of a, to b and of α, to δ, must in each case be 100% by weight, characterised in that the graft products have a peroxide graft (as OOH) of 0 to 5000 ppm and have been prepared by bringing the molten graft substrate (a) into contact with oxygen or oxygen-containing gases for a maximum of 10 minutes under conditions of vigorous mixing at a pressure of 1 to 150 bar and a temperature of 80° to 300° C., the monomers (b) which are to be grafted on the graft substrate are added immediately thereafter under conditions of vigorous mixing under pressure with exclusion of oxygen or oxygen-containing gases, and the residual monomers are removed after graft polymerisation.

2. Blends as claimed in claim 1, wherein the graft products have a peroxide graft content of from 0 to 500 ppm.

3. Blends as claimed in claim 1, wherein the component (4) is used in an amount of from 2 to 20% by weight.

4. Blends as claimed in claim 1, wherein the component (4) consists of from 80 to 98% by weight of the graft substrate and from 2 to 20% by weight of grafted units.

* * * * *